Figure 1:
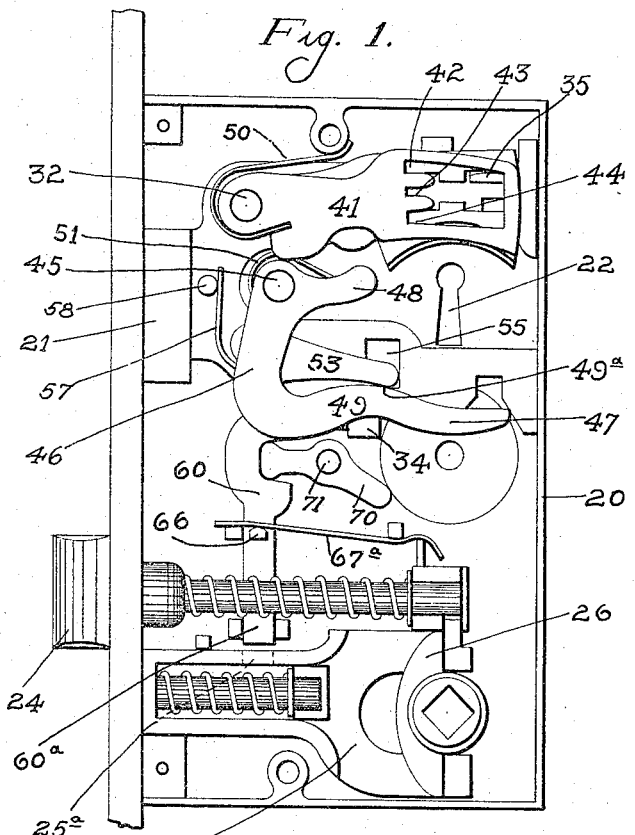

G. R. BARKER.
LOCK.
APPLICATION FILED JULY 22, 1913.

1,150,571.

Patented Aug. 17, 1915.
4 SHEETS—SHEET 1.

WITNESSES:
F. A. Carlson
Mary E. Fuller

INVENTOR.
Guy R. Barker
BY
ATTORNEY.

G. R. BARKER.
LOCK.
APPLICATION FILED JULY 22, 1913.
1,150,571.
Patented Aug. 17, 1915.
4 SHEETS—SHEET 2.
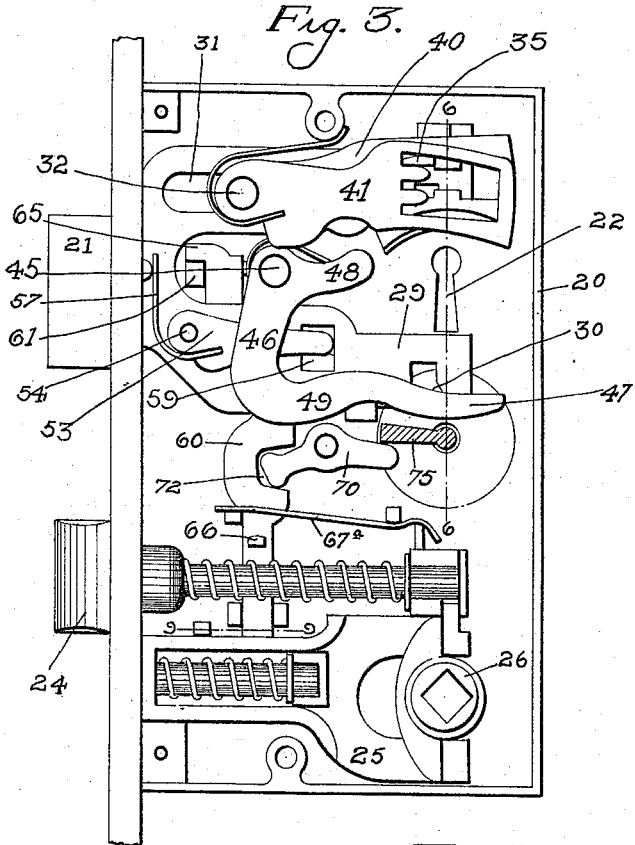
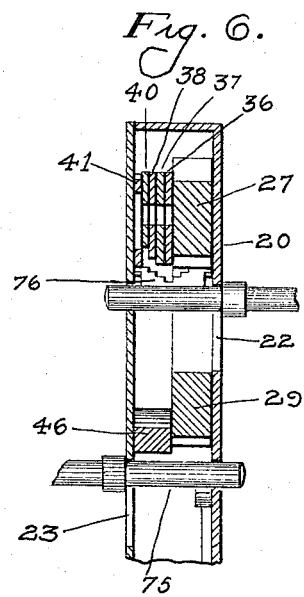
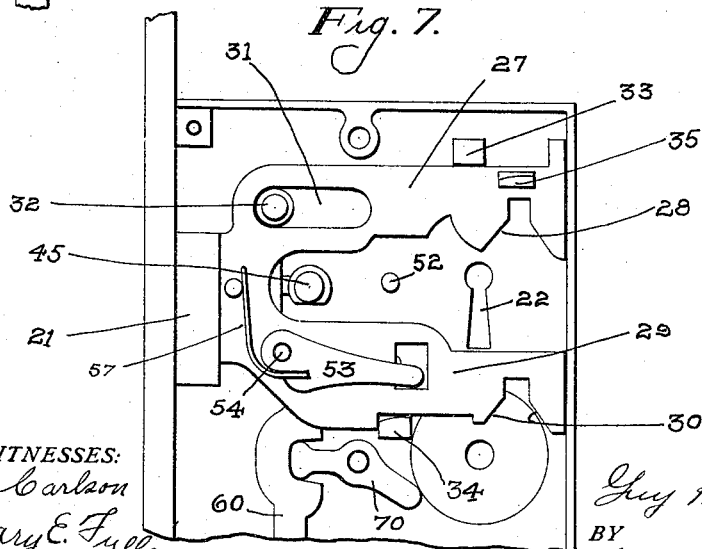
WITNESSES:
F. A. Carlson
Mary E. Fuller
INVENTOR.
Guy R. Barker
BY
ATTORNEY.

G. R. BARKER.
LOCK.
APPLICATION FILED JULY 22, 1913.
1,150,571.
Patented Aug. 17, 1915.
4 SHEETS—SHEET 3.
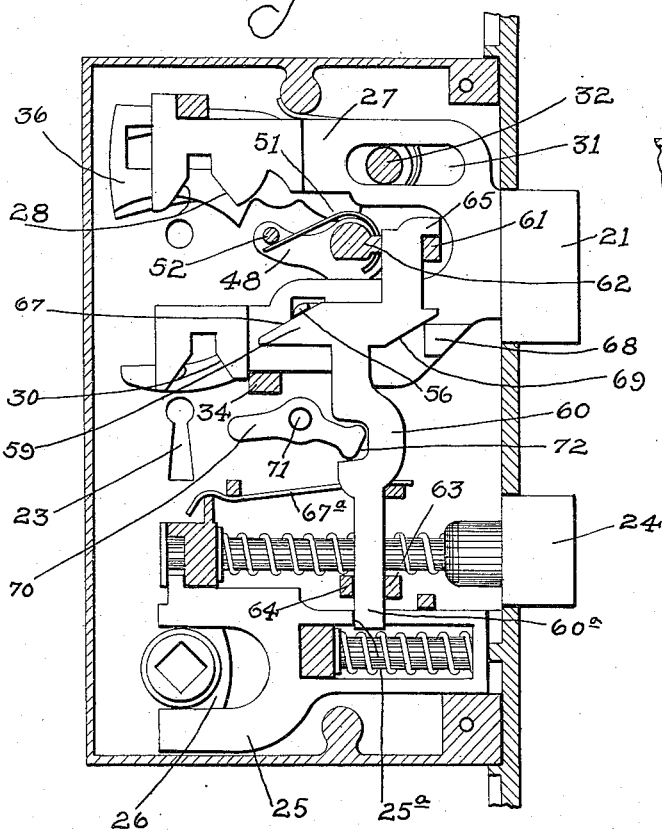
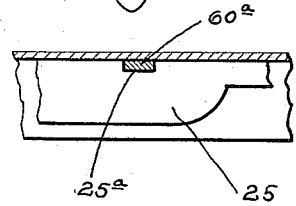
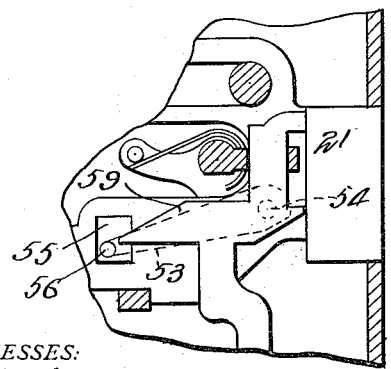
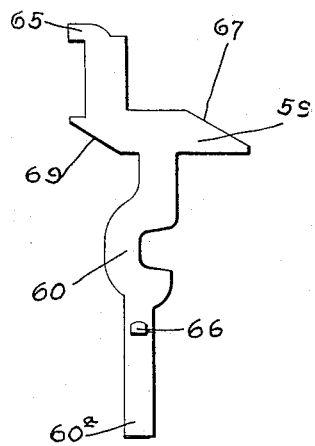
WITNESSES:
F. A. Carlson
Mary E. Fuller
INVENTOR.
Guy R. Barker,
BY
ATTORNEY.

G. R. BARKER.
LOCK.
APPLICATION FILED JULY 22, 1913.

1,150,571.

Patented Aug. 17, 1915.
4 SHEETS—SHEET 4.

WITNESSES:
F. A. Carlson
Mary E. Fuller.

INVENTOR.
Guy R. Barker
BY
ATTORNEY.

COLUMBIA PLANOGRAPH CO., WASHINGTON, D. C.

UNITED STATES PATENT OFFICE.

GUY R. BARKER, OF BRANFORD, CONNECTICUT, ASSIGNOR TO SARGENT & COMPANY, OF NEW HAVEN, CONNECTICUT, A CORPORATION OF CONNECTICUT.

LOCK.

1,150,571.  Specification of Letters Patent.  Patented Aug. 17, 1915.

Application filed July 22, 1913. Serial No. 780,451.

*To all whom it may concern:*

Be it known that I, GUY R. BARKER, a citizen of the United States, residing in the town of Branford, county of New Haven, State of Connecticut, have invented certain new and useful Improvements in Locks, of which the following is a full, clear, and exact description.

This invention relates to locks, and more particularly to hotel locks of the single bolt type wherein a dead bolt is protractable and retractable from both sides of the door and in which provision is made for blocking the operation of certain keys in the outside keyhole when the bolt is thrown from the inside by the guest key or its equivalent.

My invention also relates to that class of locks in which the customary knob actuated latch bolt is employed and in which the knob is blocked automatically by the throwing of the dead bolt from the inside only, thereby giving an indication that the room is occupied.

One of the particular objects which I have in view, is the provision of improved dead bolt tumbler mechanism for a lock of the type above specified.

More specifically, my object is to provide a dead bolt having a single group of pivoted tumblers which may be actuated by keys or equivalent devices operating at points out of alinement with each other. This group of tumblers is actuated directly by a key inserted in one (the outside) keyhole, and I employ very simple and effective mechanism for operating these tumblers by means of a key or its equivalent operative from the other side (the inside) of the door at a point offset from the outside keyhole.

My invention also has in view the provision of improved means for dogging the knob mechanism when the dead bolt is protracted from one side of the door without dogging it when the bolt is protracted from the other side.

A still further feature of improvement resides in the particular mechanism for arresting the rotation of a key in the inside keyhole in order to prevent the withdrawal of such key when the bolt is in the locked position.

Other objects of the invention are the correlation of the above mentioned mechanisms in an improved manner, and the improvement of certain general and detail features of construction and operation, as hereinafter set forth.

To these and other ends, the invention consists in the novel features and combinations of parts to be hereinafter described and claimed.

Figure 8:
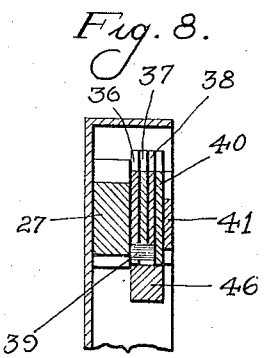
Figure 2:
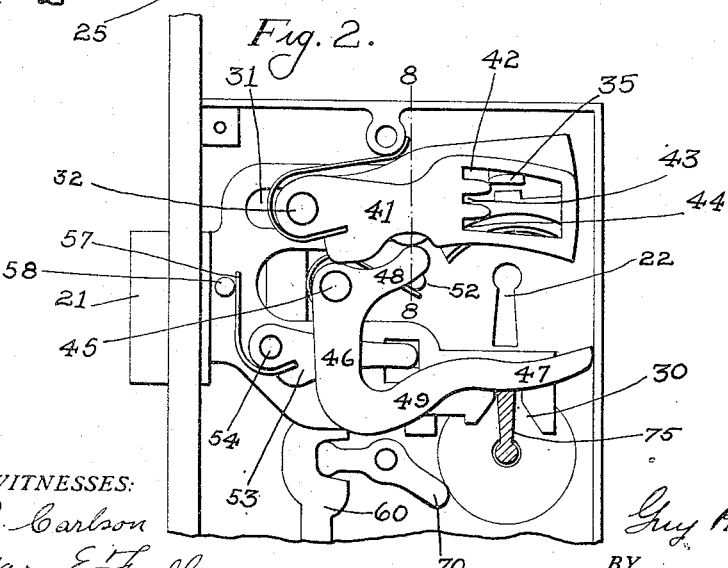
Figure 5:
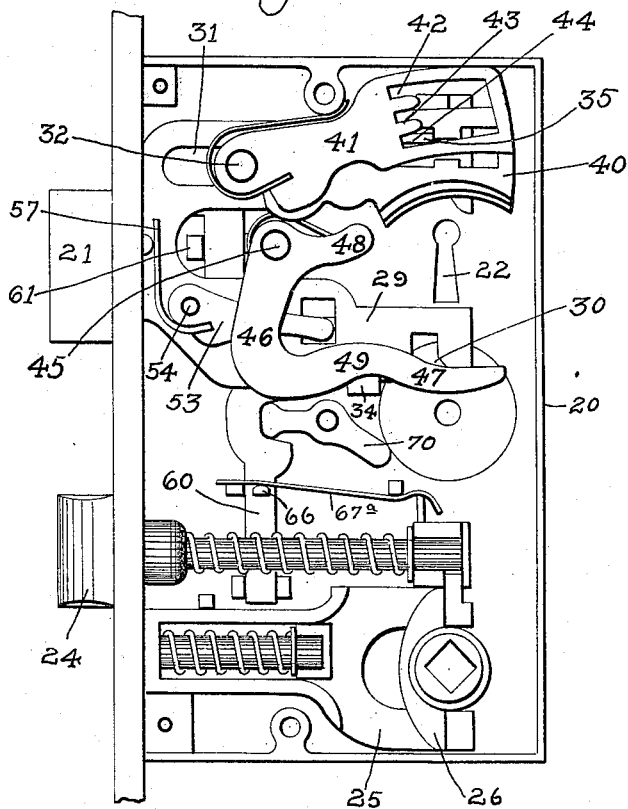
Figure 13:
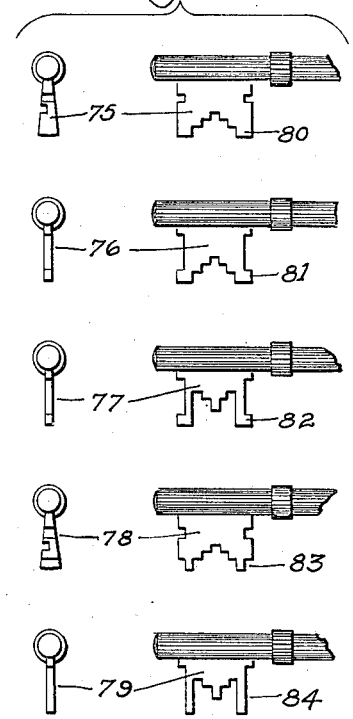
Figure 10:
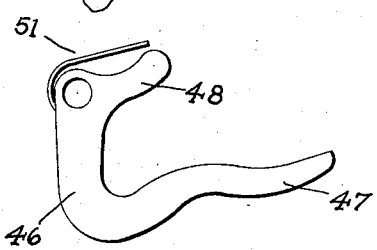
Figure 11:
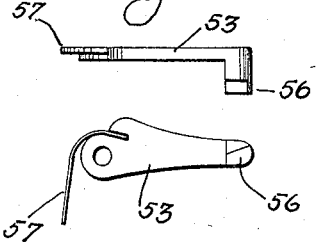

In the accompanying drawings, Figure 1 is an elevation of a lock embodying my improvements, the cap plate being removed and the dead bolt being in the retracted position, Fig. 2 is a fragment of Fig. 1 showing the dead bolt partially protracted by the inside key, Fig. 3 is a view similar to Fig. 1 showing the dead bolt fully protracted from the inside, Fig. 4 is a reverse sectional view corresponding to Fig. 3, Fig. 4ᵃ is a detail taken from the opposite side of the lock with reference to Fig. 1, showing the position of certain parts prior to the protraction of the bolt, Fig. 5 is a view similar to Fig. 1 showing the position of the parts when the bolt is protracted from the outside by the guest key, Fig. 6 is a section on line 6—6 of Fig. 3 showing how the maid's key is blocked in the outside keyhole when the door is bolted from the inside, Fig. 7 is a fragmentary view of the upper portion of the lock with the tumblers and tumbler lifter omitted, Fig. 8 is a section on line 8—8 of Fig. 2, Fig. 9 is a section on line 9—9 of Fig. 3, Fig. 10 is a detail of the tumbler lifter, Fig. 11 is a detail of the actuating member for the knob dogging device, Fig. 12 is a detail of the knob dogging device, and Fig. 13 shows the bits of the several keys.

Referring to the drawings, 20 designates a case of usual type and 21 designates the dead bolt. In the form shown, this dead bolt 21 may be operated by keys inserted in an outside keyhole 22 or in an inside keyhole 23. The operation of the bolt by a key inserted from the inside is not important, as in some cases a thumb-turn member may be substituted.

24 indicates the usual latch bolt adapted to be retracted by the ordinary knob shoe or yoke 25 coöperating in the customary manner with a hub or rollback 26 through which passes the usual knob spindle (not shown). In the form illustrated, the latch bolt is located beneath the dead bolt.

Referring to Fig. 7, it will be noted that the dead bolt 21 has a shank of forked or bifurcated shape comprising an upper leg or branch 27 having talons 28, and a lower leg or branch 29 having talons 30. The bolt is guided and limited in its movement by means of a slot 31 in the upper leg coöperating with a post 32, and it is further guided and limited in its movement by a lug 33 coöperating with the upper leg and by a lug 34 coöperating with the lower leg. A group of tumblers is pivoted on the post 32 to coöperate with the tumbler stump or fence 35 on the upper leg 27. In the form shown, this group of tumblers comprises a master key or carrier tumbler 36, tumblers 37 and 38 coöperating in the usual way with the pin 39 of the carrier tumbler, and an independent tumbler 40 overlying the tumblers 37 and 38 and free of the pin 39. These tumblers are provided with the usual gatings and lugs and coöperate with the stump or fence 35 in the usual way. A ward or key blocking member 41 is also pivoted on the post 32 and said ward is provided with a gating having notches 42, 43, 44 which coöperate with the tumbler stump 35 in the manner presently described.

Located between the legs or branches of the bolt is a fixed post 45 which serves as a pivot for a tumbler lifter 46 having a sweep 47 overlying the talons 30 at a point adjacent the inside keyhole. This tumbler lifter is preferably in the form of an elbow lever having a relatively short tumbler actuating arm or extension 48. The arm 48 is approximately parallel to the longer arm 49 having the sweep 47 and extends on the same side of the pivot 45. The extremity of the arm 48 is adapted to engage depending portions located intermediate of the length of the tumblers 36 and 40 respectively, without engaging the tumblers 37, 38 or the ward 41, as shown in Fig. 8. The tumblers 37, 38 and 40 and the ward 41 are provided with the usual springs 50. The carrier tumbler 36 is unprovided with a spring and receives its spring action by contact with the other tumblers. The tumbler lifter 46 is acted on by a spring 51 coöperating with a post 52 on the case, which spring 51 normally holds the tumbler lifter in the position shown in Fig. 1 with the sweep 47 overlying the talons 30 and the arm 49 in contact with the lug 34 which acts as a stop for the tumbler lifter as well as a guide for the bolt.

Interposed between the tumbler lifter 46 and the lower leg of the bolt is a small lever 53 detachably pivoted on the bolt by means of a pin 54 on the bolt. The lower leg of the bolt is provided with an opening or aperture 55 through which extends a projection 56 on the free extremity of lever 53. A spring 57 carried by lever 53 and reacting against a pin 58 on the bolt normally holds the lever 53 in such a position that the projection 56 is in contact with the lower edge of the opening 55. In this position, the projection 56 is slightly below (Fig. 49) a lateral extension 59 on a knob dogging member 60 which preferably takes the form of a slide guided along the back of the case in a vertical direction by means of guide lugs 61, 62, 63, 64. The movement of the slide 60 is limited in one direction by a lateral extension 65 coöperating with the lug 61 and movement in the opposite direction is limited by a lug 66 on the slide coöperating with a stop spring 67ª. The projection 56 of lever 53 when raised in the opening 55 will coöperate with an inclined surface 67 on the lateral extension 59 as the bolt is thrown, in such a manner as to move the slide 60 downwardly, whereby the lower exteremity 60ª of said slide will engage a notch 25ª of the knob shoe 25. In this way the knob shoe and the knobs will be dogged against movement. When the bolt is withdrawn, a projection 68 on the back of the same will engage another inclined edge or surface 69 on the extension 59, and thereby raise the slide out of engagement with the knob shoe so that the knobs will be free to retract the latch bolt.

The member 60 not only dogs and releases the knobs or other manual retracting devices for the latch bolt, but it also operates a member to arrest the rotation of a key in the inside keyhole 23. In the form shown, this key arresting device is in the form of a lever 70 pivoted intermediate of its length on a post 71 and having one extremity extending into a recess 72 of the slide 60. The other extremity of the lever 70 is adapted to be thrown in to the path of the key as the slide is moved downward by the throwing of the bolt, as shown in Fig. 3. The engagement of the lever 70 in the recess 72 also provides for the withdrawal of the lever 70 from the path of the key as the slide 60 is moved upward.

Fig. 13 shows the bits of the keys used in connection with this lock. 75 is the guest key bit, 76 the bit of the matser key or maid's key, 77 the bit of the grand master key, 78 the bit of the display key and 79 the bit of the emergency or proprietor's key. The bits 75, 76 and 77 are provided with full ends of corners 80, 81 and 82 respectively, to engage and raise the movable ward 41 at the same time that the tumblers of the bolt are actuated. The display key bit 78 on the other hand, is slightly cut away at the corners, as shown at 83, in order to raise the ward 41 to a less extent, and the bit 79 of the emergency key is cut away at the ends, as shown at 84, in order to clear the ward entirely. The other distinctions between the several keys will be understood by those skilled in the art and they need not be mentioned in further detail.

The operation of the lock is substantially as follows: Supposing that the guest wishes to lock his room against intrusion, he inserts the guest key, having the bit 75, into the inside keyhole 23 and turns the same in an anti-clockwise direction with respect to Fig. 1. The key bit will contact with the sweep 47 of the tumbler lifter 46 and hence the tumbler lifter will we swung on its pivot 45 in such a direction as to engage the arm 48 with the tumblers 36 and 40 respectively. As the arm 48 is moved upwardly, these tumblers will be moved upward by direct contact therewith, and the tumblers 37, 38 will be carried upward by engagement with the pin 39. Hence all of the tumblers will be released from the tumbler stump 35, and as the key engages the lower talons 30 of the bolt, the bolt will be protracted. Inasmuch as the tumbler lifter 46 does not raise the ward 41, the tumbler stump 35 will be carried into the notch 42 of the ward 41, which notch is normally in alinement with said stump. The ward will therefore be locked against upward movement, and as a result, it will be impossible to retract the bolt from the outside of the door by means of the master key, the grand master key, the display key, or another guest key, inasmuch as said keys are not bitted to clear the ward. However, should the proprietor of the hotel desire to gain access to the room, he may do so by means of the emergency key, which will clear the ward 41 and which will therefore retract the bolt by actuation of the carrier tumbler 36 and the independent tumbler 40. The blocking of the master key under the circumstances noted, is shown in Fig. 6.

When the bolt is thrown from the inside by the guest key, the raising of the tumbler lifter 46 will elevate the free end of the lever 53 in the bolt slot or opening 55 by direct engagement of such free end with the intermediate portion 49ª of the arm 49. The projection 56 will therefore be carried upward into coöperation with the inclined edge 67 of the slide 60, and hence as the bolt is protracted the projection 56 in being carried along the inclined edge 67 will force the slide 60 downwardly and thereby dog the knob shoe in the manner previously described. As the slide 60 is moved downward, it will tilt the key arresting lever 70 so as to block a full rotation of the key in the inside keyhole, as also previously described. It will therefore be impossible to remove the key from the keyhole with the bolt in its protracted position. When the rotation of the key in the inside keyhole is reversed, the tumblers 36, 37, 38 and 40 will be again elevated by the tumbler lifter 46 and the bolt may be withdrawn in an obvious manner. The projection 68 on the bolt will contact with the inclined edge 69 of the dogging slide and thereby raise said slide out of engagement with the knob shoe, and the spring 57 of the lever 53 will return said lever to the normal position shown in Fig. 1.

Supposing now that the door is to be locked from the outside by the guest key, the bit of said key when inserted and rotated in the outside keyhole, will obviously lift the tumblers 36, 37, 38 and 40 without affecting the tumbler lifter 46. The guest key bit will also engage and raise the ward 41 to such an extent that as the bolt moves home, the stump 35 will engage the lowermost notch 44 of the ward gating and lock the ward in its uppermost position, so that the bolt may be retracted from the outside by any of the keys. Inasmuch as the tumbler lifter is not actuated, the projection 56 of lever 53 will continue to occupy its lowermost position in the slot 55, and hence said projection will not engage the inclined surface 67 of the dogging slide, but will move forward freely under the straight lower edge of the extension 59 without shifting said slide, as shown in Fig. 5. The knobs will therefore be free to withdraw the latch bolt, indicating that the door has been locked from the outside rather than from the inside. Moreover, as the key arresting device 70 will not be actuated, a key may be inserted in the inside keyhole and rotated in a direction to withdraw the bolt so that it will be impossible to lock any one in the room. Practically this same operation takes place when the bolt is thrown from the outside by the guest key, the master key, the grand master key or the display key except that in the case of the display key, the ward 41 will only be elevated to such an extent as to engage the stump with the intermediate notch 43 of the ward, under which conditions it will be impossible to withdraw the bolt from the outside by any but the emergency key.

The foregoing description is necessarily a detailed one in so far as it concerns the particular embodiment of my invention selected for illustration and description, and I have not attempted to describe or illustrate the numerous modifications which may be adopted within the scope of the claims.

What I claim is:

1. In a lock, the combination of a case having inside and outside key holes out of alinement with each other, a bolt in said case having two legs, each of said legs provided with a pair of talons, a group of tumblers overlying one of said legs and operable by a key inserted in one of said key holes, a tumbler lifter having a sweep overlying the other leg and adapted to be engaged by a key inserted in the other keyhole, and provided with an arm adapted to engage said tumblers, and means for pivoting said tumbler lifter to the case between the legs of the bolt; substantially as described.

2. In a lock, the combination of a case having inside and outside keyholes out of alinement with each other, a bolt in the said case, having a shank formed of parallel legs or branches, each of said legs or branches having a pair of talons, a group of pivoted tumblers overlying one of said legs and coöperating with one pair of talons, a tumbler lifter having two arms, one of said arms coöperating with the other pair of talons, and the other arm being adapted to engage said tumblers intermediate of the ends of said tumblers, and a pivot for said tumbler lifter fixed relative to the case between the legs or branches of the bolt, and located approximately at the junction of the tumbler lifter arms; substantially as described.

3. In a lock, the combination of a bolt, a master key tumbler therefor, a locking tumbler supported by said master key tumbler, a locking tumbler supported independently of said master key tumbler, a movable ward, and a pivoted tumbler lifter, adapted to engage and operate said master key tumbler and said independent locking tumbler, but to clear said ward; substantially as described.

4. In a lock, the combination of a bolt, a pivoted master key tumbler therefor, having a pin, a pivoted locking tumbler, supported on said pin, a pivoted locking tumbler grouped with the other tumblers, but independent of said pin, a movable ward pivoted with said tumblers, a pivoted tumbler lifter adapted to engage the edges of said master key tumbler and said independent locking tumbler, and means to actuate said tumbler lifter and protract the bolt without lifting said movable ward; substantially as described.

5. In a lock, the combination of a case, having keyholes at opposite sides, out of alinement with each other, a bolt having two legs or branches each provided with a pair of talons, said talons adjacent the respective keyholes, tumbler mechanism associated with one pair of talons and one keyhole, comprising a master key tumbler, an ordinary locking tumbler, supported by the master key tumbler, and a locking tumbler independent of said master key tumbler, a movable ward grouped with said tumblers, and a tumbler lifter coöperating with the other keyhole and the other talons, pivoted in the case between the legs of said bolt, and having a part adapted to engage and operate said master key tumbler and said independent locking tumbler; substantially as described.

6. In a lock, the combination of a case, two members in said case, slidable at right angles to each other, one of said members operable from both sides of the case, and means, inoperative when the first member is actuated from one side of the case, to actuate the second member thereby as the first member is operated from the other side of the case; substantially as described.

7. In a lock, the combination of a sliding member, a second member slidable at right angles thereto, means to operate said first member to give the second member a sliding movement, and means to operate the first member without operating the second member, substantially as described.

8. In a lock, the combination of a case having inside and outside keyholes, a bolt protractable by a key inserted in either keyhole, and a movable key arresting device operative automatically by the protraction of the bolt from one side of the door by any key which will protract the bolt, but inoperative by the protraction of the bolt by any key from the opposite side of the door; substantially as described.

9. In a lock, the combination of a case, having a keyhole at one side of the door, a bolt protractable by a key inserted in said keyhole, means to protract the bolt from the opposite side of the door, and a movable key arresting device associated with said keyhole and automatically operative as the bolt is protracted by a key inserted therein, but inoperative as the bolt is protracted by said second protracting means; substantially as described.

10. In a lock, a sliding member movable in either direction from either side of the door, a second sliding member movable at right angles to the first, and means for shifting said second member lengthwise by the movement of the first when said first member is operated from one side only of the door; substantially as described.

11. In a lock, the combination of a latch bolt, knob mechanism therefor, a sliding member movable in either direction from either side of the door, and a sliding knob dogging member movable at an angle to said first named member and operated by the latter when said first member is actuated from one side only of the door; substantially as described.

12. In a lock, a bolt protractable from either side of the door, a member slidable at right angles to the bolt, and means, inoperative when the bolt is protracted from one side of the door, to actuate said member as the bolt is protracted from the other side; substantially as described.

13. In a lock, a latch bolt, a manual retracting device therefor, a dead bolt protractable from either side of the door, a slide for dogging said manual retracting device, movable at right angles to said dead bolt, and means to actuate said slide by the protraction of said dead bolt from one side only of the door; substantially as described.

14. In a lock, the combination of a dead bolt, a member movable at right angles to the dead bolt, means to protract said dead bolt from the inside of the door, and means to shift said member as the bolt is protracted by the inside protracting means without shifting it as the bolt is protracted by the outside protracting means; substantially as described.

15. In a lock, the combination of a latch bolt, a shoe for retracting said latch bolt, a dead bolt, a slide movable at right angles to said dead bolt and adapted to engage and release said shoe, an outside protracting means for said dead bolt, an inside protracting means for the same, and means for shifting said slide into engagement with the shoe as said dead bolt is protracted from the inside, said slide being inoperative to dog said shoe as said dead bolt is protracted from the outside; substantially as described.

16. In a lock, two members movable at right angles to each other, one of said members having an inclined surface, and the other member having a projection to coöperate with said surface in transmitting movement from one of said members to the other, said projection and said inclined surface being relatively displaceable so that one of said members may be actuated independently of the other; substantially as described.

17. In a lock, two members movable at right angles to each other, one of said members having an inclined surface, and the other member having a projection to coöperate with said surface in transmitting movement from one of said members to the other, said projection being movable into an inoperative position with respect to said inclined surface; substantially as described.

18. In a lock, the combination of a latch bolt, a retracting device therefor, a dogging member for said retracting device, a dead bolt adapted to operate said dogging member, a tumbler for said dead bolt operative from one side of the door, and a tumbler lifter operative from the opposite side of the door and controlling the operation of said dogging member by said bolt; substantially as described.

19. In a lock, the combination of a dead bolt, a tumbler therefor, operative from one side of the door, a tumbler lifter operative from the other side of the door, a latch bolt, a latch bolt retracting device, and a dogging device for said retracting device controlled by said tumbler lifter; substantially as described.

20. In a lock, the combination of a dead bolt, a tumbler therefor, operative from one side of the door, a tumbler lifter operative from the other side of the door, a latch bolt, a latch bolt retracting device, and a dogging device for said retracting device movable into dogging position by the dead bolt when said tumbler lifter is actuated; substantially as described.

21. In a lock, the combination of a dead bolt, a tumbler therefor, operative from one side of the door, a tumbler lifter operative from the other side of the door, a latch bolt, a latch bolt retracting device, and a dogging device for said retracting device movable into dogging position by the dead bolt when said tumbler lifter is actuated, said tumbler being movable independently of the tumbler lifter and the latter being normally out of engagement with the tumbler; substantially as described.

22. In a lock, a case having inside and outside keyholes, a bolt protractable by a key inserted in either keyhole, a movable key arresting device associated with one of said keyholes and means for operating said device as the bolt is protracted by a key inserted in said keyhole without operating it as the bolt is protracted by a key inserted in the other keyhole; substantially as described.

23. In a lock, a case having inside and outside keyholes out of alinement with each other, a bolt protractable by a key inserted in either keyhole, a movable device associated with the inside keyhole to prevent a full rotation of a key therein, and means to shift said device into key blocking position as the bolt is protracted by the inside key without moving said device into key blocking position as the bolt is protracted by the outside key; substantially as described.

24. In a lock, a case having inside and outside keyholes, a dead bolt in said case protractable by a key inserted in either keyhole, a latch bolt, a latch bolt retracting device, a dogging member for said retracting device, a key arresting member associated with the inside keyhole, and means to operate both of said members as the bolt is protracted from the inside without operating them as the bolt is protracted from the outside; substantially as described.

25. In a lock, a case having a keyhole at the inside of the door, a dead bolt in said case operative by a key inserted in said keyhole, a latch bolt, a retracting device for said latch bolt, means to dog said retracting device as said bolt is protracted by said key, and a key arresting member operated by said dogging means; substantially as described.

26. In a lock, a case having a keyhole at the inside of the door, a dead bolt in said case operative by a key inserted in said keyhole, a latch bolt, a retracting device for said latch bolt, a slide to dog said retracting device as said bolt is protracted by said key, and a key arresting member operated by said slide; substantially as described.

27. In a lock, a case having inside and outside keyholes, a dead bolt, a tumbler operative by a key inserted in the outside keyhole, a tumbler lifter operative by a key inserted in the inside keyhole, and means controlled by the operation of said tumbler lifter to prevent or permit a complete rotation of the key in the inside keyhole; substantially as described.

28. In a lock, a case having inside and outside keyholes, a bolt operative by a key inserted in the outside keyhole, a tumbler for said bolt, a tumbler lifter operative by a key inserted in the inside keyhole, and means actuated automatically by the raising of said tumbler lifter by the inside key, and by the throwing of the bolt, to prevent a full rotation of said key in the inside keyhole; substantially as described.

29. In a lock, a dead bolt protractable from either side of the door by means of a key, a latch bolt, latch bolt retracting means, a dogging device for said retracting means operative as said bolt is thrown from the inside only, and a pivoted device operated by said dogging device to prevent a full rotation of the key inserted in the inside keyhole; substantially as described.

30. In a lock, a case having a keyhole, a dead bolt in said case, a key to operate said bolt by way of said keyhole, a key blocking device in said case adjacent said keyhole, and a sliding member operated by the bolt to actuate said key blocking device and prevent a full rotation of the key in said keyhole; substantially as described.

In witness whereof, I have hereunto set my hand on the 19th day of July 1913.

GUY R. BARKER.

Witnesses:
E. M. HORAN,
BENA WOOD.

Copies of this patent may be obtained for five cents each, by addressing the "Commissioner of Patents, Washington, D. C."